United States Patent
Griss et al.

(10) Patent No.: US 7,643,054 B2
(45) Date of Patent: Jan. 5, 2010

(54) DIRECTED GUIDANCE OF VIEWING DEVICES

(75) Inventors: Martin L. Griss, Palo Alto, CA (US); Craig P. Sayers, Menlo Park, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1371 days.

(21) Appl. No.: 10/315,685

(22) Filed: Dec. 9, 2002

(65) Prior Publication Data

US 2004/0109007 A1   Jun. 10, 2004

(51) Int. Cl.
H04N 7/18   (2006.01)
(52) U.S. Cl. ...................................... 348/148
(58) Field of Classification Search ................. 348/148, 348/149, 8; 701/213, 201; 702/150; 705/6; 342/357.13; 455/90.2; 345/7, 9, 633, 8; 359/400; 340/531.13; H04N 7/18
See application file for complete search history.

(56) References Cited

U.S. PATENT DOCUMENTS

| | | | | |
|---|---|---|---|---|
| 5,581,271 A * | 12/1996 | Kraemer | ........................ | 345/8 |
| 5,815,411 A * | 9/1998 | Ellenby et al. | ............... | 702/150 |
| 6,002,379 A * | 12/1999 | Udagawa | ........................ | 345/9 |
| 6,023,241 A * | 2/2000 | Clapper | .................. | 342/357.13 |
| 6,181,302 B1 * | 1/2001 | Lynde | ............................ | 345/7 |
| 6,233,094 B1 * | 5/2001 | Tsuda | ......................... | 359/400 |
| 6,321,158 B1 * | 11/2001 | DeLorme et al. | ............ | 701/201 |
| 6,738,712 B1 * | 5/2004 | Hildebrant | ................... | 701/213 |
| 6,763,226 B1 * | 7/2004 | McZeal, Jr. | ................. | 455/90.2 |
| 6,917,370 B2 * | 7/2005 | Benton | ........................ | 345/633 |
| 2002/0026289 A1 * | 2/2002 | Kuzunuki et al. | ............ | 702/150 |
| 2005/0144049 A1 * | 6/2005 | Kuzunuki et al. | ............... | 705/6 |

* cited by examiner

*Primary Examiner*—Tung Vo

(57) ABSTRACT

Techniques for directed guidance of viewing devices which enable a spectator to be guided toward points of interest using guidance cues from viewpoint control sources including other viewing devices or event directors. A viewing system according to the present techniques include a viewpoint control source that generates a guidance cue for a point of interest and a viewing device that obtains the guidance cue from the viewpoint control source and in response generates a guidance signal for moving a viewpoint of the viewing device in a direction indicated by the guidance cue.

23 Claims, 4 Drawing Sheets

DIRECTED GUIDANCE OF VIEWING DEVICES

BACKGROUND OF THE INVENTION

1. Field of Invention

The present invention pertains to the field of viewing devices. More particularly, this invention relates to guidance of viewing devices.

2. Art Background

Viewing devices may be employed for enhanced viewing in a wide variety of situations. For example, a spectator of an event may employ a viewing device to obtain close up views of actions or points of interest within the event. Examples of events include sporting events, theatrical events, musical events, circuses, trade shows, conferences, as well as visits to recreational areas, wilderness preserves, and amusement parks, to name a few examples. Viewing devices that may be used for event viewing include binoculars, telescopes, electronic displays, cameras, etc.

It is often desirable to guide a spectator of an event to view a point of interest within the event. For example, at an automobile racing event it may be desirable to guide a spectator to view an accident or a pit stop involving the spectator's favorite driver, etc.

Prior methods for guiding a spectator to view a point of interest usually involve providing verbal cues to the spectator. For example, an announcer at an event may use a PA system to direct the attention of spectators. An example of a verbal cue is a verbal reference such as "the top of turn three" or "the entrance to the pits." Unfortunately, these methods are usually slow and inaccurate. Moreover, these methods may require that a spectator posses knowledge of the physical layout of an event in order to properly interpret verbal references.

Other methods for guiding a spectator to view a point within an event include visual cues such as those provided when a friend of the spectator points in a particular direction. Such methods are also usually slow and inaccurate. Furthermore, a spectator who is concentrating on obtaining a view through a viewing device may find it a distraction to receive such verbal or visual cues.

SUMMARY OF THE INVENTION

Techniques are disclosed for directed guidance of viewing devices which enable a spectator to be guided toward points of interest using guidance cues from viewpoint control sources including other viewing devices or event directors. A viewing system according to the present techniques include a viewpoint control source that generates a guidance cue for a point of interest and a viewing device that obtains the guidance cue from the viewpoint control source and in response generates a guidance signal for moving a viewpoint of the viewing device in a direction indicated by the guidance cue. The present techniques enable multiple spectators to share a live experience by directing viewpoints to a common spot within an event.

Other features and advantages of the present invention will be apparent from the detailed description that follows.

BRIEF DESCRIPTION OF THE DRAWINGS

The present invention is described with respect to particular exemplary embodiments thereof and reference is accordingly made to the drawings in which.

DETAILED DESCRIPTION

Figure 1:
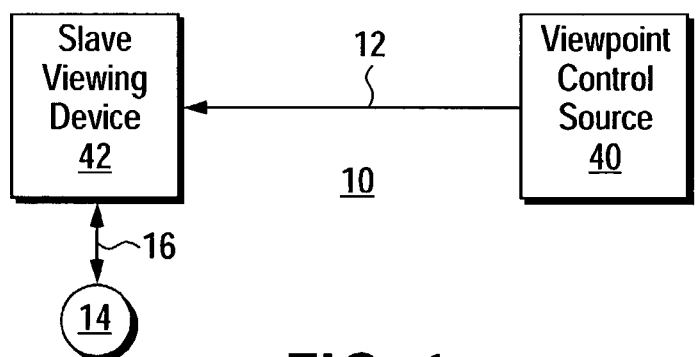
FIG. 1 shows a viewing system according to the present techniques.

FIG. 1 shows a viewing system 10 according to the present techniques. The viewing system 10 includes a viewpoint control source 40 and a slave viewing device 42 which communicate via a communication path 12. The slave viewing device 42 may be implemented as a pair of binoculars, a telescope, a video camera, or a still camera, to name a few examples. The viewpoint control source 40 may be another viewing device that operates as a master viewing device or may be a central director of an event or some other source of guidance cues.

A user 14 physically controls a viewing direction, i.e. viewpoint, of the slave viewing device 42. For example, the slave viewing device 42 may be a handheld device or a head mounted device or may be a device mounted on a tripod or other mechanism which may be manipulated by the user 14.

The viewpoint control source 40 transfers a guidance cue via the communication path 12. The guidance cue is used to indicate a viewing direction toward which the slave viewing device 42 should be moved. The viewpoint control source 40 generates guidance cues in real-time to guide the user 14 in viewing points of interest in a live event. The guidance cue may include a set of optical parameters associated with the viewpoint control source 40—for example viewpoint orientation, focus, etc., or an image sampled by the viewpoint control source 40, or information pertaining to landmarks—for example physical coordinates—in a live event, or a combination of these elements.

The slave viewing device 42 obtains the guidance cue from the viewpoint control source 40 and in response guides the viewpoint of the slave viewing device 42. In some embodiments, the slave viewing device 42 generates a guidance output 16 which provides a guidance stimulus that guides or encourages the user 14 to move the viewing direction of the slave viewing device 42. In other embodiments, a viewpoint control mechanisms in the slave viewing device 42 is directly influenced in response to the guidance cue. In still other embodiments, a combination of guidance stimulus and direct viewpoint control may be employed.

A guidance stimulus provided by the guidance output 16 may include haptic feedback to the user 14 which encourages the user 14 to move the slave viewing device 42 in a particular direction. The haptic feedback may cause the user 14 to feel that the slave viewing device 42 is pushing or pulling them in a particular direction.

In one embodiment, the slave viewing device 42 is a binocular style viewing device with four finger grips at the top and bottom of each barrel. The finger grips are active surfaces that feel like they move or press on the fingers of the user 14 differentially, thereby providing the guidance output 16. This presents an illusion of encouraging the user 14 to move the binoculars towards a particular direction. The active finger grips are used as feedback pads that communicate a sense of "look up" or "look down" or "look left" or "look right" to the user 14.

In another embodiment, very small pins on the grips of the slave viewing devices 42 move in or out like Braille readers to communicate a sense of movement to the user 14. These small pins may feel like they push or buzz or recede. Alternatively, very small pads that inflate or contract may be used to give the user 14 the feeling of movement in some direction.

The haptic feedback generated by the slave viewing device 42 need not be perfect or very large to provide enough to encourage the user 14 to point the slave viewing device 42 in roughly the correct direction. Fine control may then be achieved automatically—either by electro-mechanical or entirely digital pan/zoom controls. Electronic zoom, focus and shake removal functionality provided in the slave viewing device 42 may be combined to give both automated fine tuning of position and vibration removal once near the desired viewing direction.

A guidance stimulus provided by the guidance output 16 may include audio feedback which guides the user 14 to move the viewing direction of the slave viewing device 42. One example of audio feedback is 3D spatial audio that encourages directional movement of the user 14. Another example is a voice over saying "left" or "right", "faster" or "slower", etc.

A guidance stimulus provided by the guidance output 16 may include visual feedback. An example of a visual feedback is a variable-sized flashing cursor arrow placed in an image which is obtained by the slave viewing device 42.

The slave viewing device 42 may generate any combination of audio, visual, or haptic feedback to the user 14. The type of feedback may be specified in a set of preferences in the slave viewing device 42 which are alterable by the user 14.

In an alternative embodiment, the slave viewing device 42 includes small gyroscopes or accelerometers that provide relatively stable reference points and allow small amounts of motion feedback so that resistance and encouragement is felt by the user 14 while reorienting the slave viewing device 42. A rapidly spinning gyroscope feels like it wants to move in certain directions. This effect may be enhanced by the other haptic feedback devices. A small amount of increasing resistance feedback enables the user 14 to detect that a destination viewing direction is close to being reached. This enables the user 14 to slow down when doing a fast pan for example.

The gyroscopes/accelerometers in the slave viewing device 42 may continuously undergo re-calibration by capturing a stable reference point when at rest for a defined time period and then comparing a GPS-derived signal with integrated accelerometer signals. Machine learning techniques may be used to improve the calibration in response to any observed discrepancy between a final viewpoint of the slave viewing device 42 and the direction given by a guidance cue from the viewpoint control source 40.

In some embodiments, the slave viewing device 42 includes back and forth controls such as zoom or focus which have mechanisms to make them feel like they have started to move in a certain direction. Alternatively, such controls may offer initial resistance if the user 14 tries to move away from a viewing direction given by the guidance cues. This small amount of movement may be combined with an initial automatic setting of the controls and/or be used to help in the fine tuning after the coarse manual movement.

The communication path 12 may be wired-based communication path or a wireless communication path such as infrared or radio frequency link.

In some embodiments, the viewpoint control source 40 transfers additional information via the communication path 12 which is related to a guidance cue. The additional information may provide audio and/or visual information to the user 14 which describes a point of interest toward which the user 14 is being encouraged to move.

Figure 2:
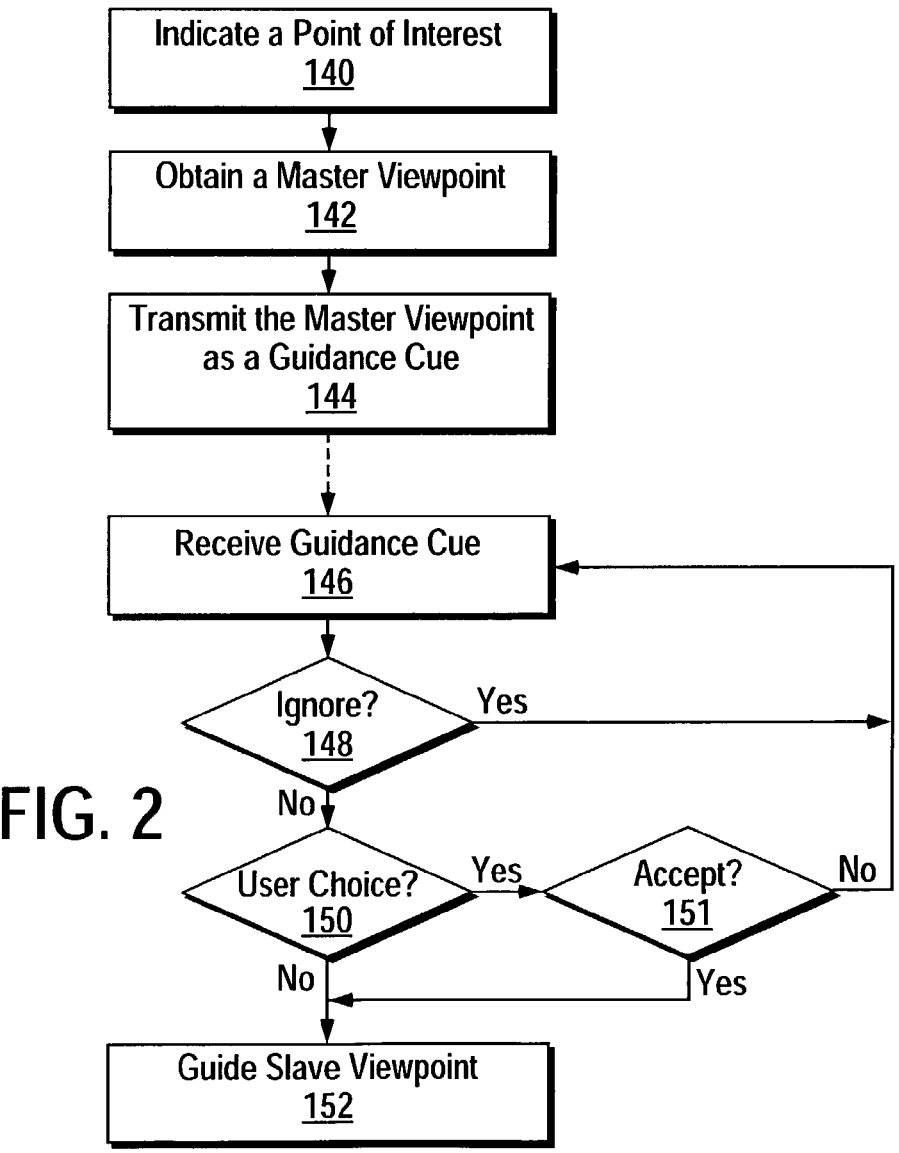
FIG. 2 shows a method for directed guidance of viewing devices in one embodiment.

FIG. 2 shows a method for directed guidance of viewing devices in one embodiment. At step 140, an operator of viewpoint control source indicates that a slave viewing device should look at a particular point of interest. For example, a user of a master viewing device may press a button on the master viewing device which in effect indicates "look here," i.e. to where the master viewing device is pointed.

In response to step 140, the viewpoint control source determines a master viewpoint by measuring its viewpoint at step 142. At step 144, the viewpoint control source transfers the master viewpoint to a slave viewing device as a guidance cue. At step 144, the viewpoint control source may also transfer a media stream to the slave viewing device. The media stream may provide information related to objects or activity associated with the guidance cue transmitted at step 144.

At step 146, the slave viewing device receives the viewpoint from the viewpoint control source. At step 148, the slave viewing device may ignore the viewpoint. For example, the user of the slave viewing device may have set a preference that causes it to ignore guidance cues from specified sources or particular types of guidance cues—for examples those related to types activity which the user does not have a desire to view. The type of activity associated with a guidance cue may be encoded in the guidance cue itself or may be contained in an accompanying media stream.

At step 150, the user may be given an option to accept or reject the guidance cue received at step 146. This option may be expressed in user preferences. If the user is given no choice at step 150 or if the user accepts at step 151, then at step 152 the received guidance cue is used to guide the viewpoint of the slave viewing device.

Figure 3:
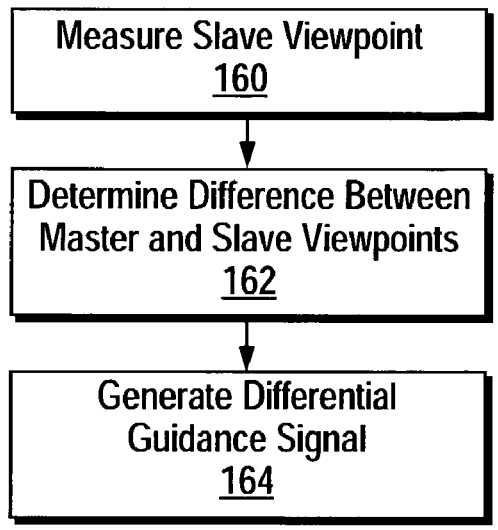
FIG. 3 shows a method for generating a guidance signal for guiding a viewpoint of a slave viewing device.

FIG. 3 shows a method for generating a guidance signal for guiding the viewpoint of a slave viewing device. The steps shown may be performed by a slave viewing device in response to a viewpoint guidance cue.

At step 160, the slave viewing device measures its viewpoint. At step 162, the slave viewing device computes a difference between the viewpoint expressed in the guidance cue and its viewpoint. At step 164, the slave viewing device generates a differential guidance signal in response to the computed difference. The differential guidance signal may guide the movement of the slave viewing device by encouraging user movement of the slave viewing device or by direct control of a viewpoint mechanism in the slave viewing device or a combination of these methods.

The computations at step 162 may involve any form of guidance geometry including movements along one axis, e.g. left/right, or two axes, e.g. left/right/up/down, or three axes, e.g. left/right/up/down/back/forth. The computations at step 162 may be based on angular orientation of the master and slave viewing devices.

For example, a guidance cue from a viewpoint control source may indicate a viewpoint of 10 degrees left of center and a viewpoint of the slave viewing device may be 20 degrees right of center. The difference from step 162 is −30 degrees. At step 164, a differential guidance signal is generated for moving the viewpoint of the slave viewing device to the left until a viewpoint of 10 degrees left is obtained.

In another example, a guidance cue from a viewpoint control source may indicate a viewpoint of 10 degrees left of center and 5 degrees down from center and a viewpoint of the slave viewing device may be 20 degrees right of center and 5 degrees up from center. The difference from step 162 is −30 degrees/−10 degrees. At step 164, a differential guidance signal is generated for moving the viewpoint of the slave viewing device to the left and down until a viewpoint of 10 degrees left and 5 degrees down is obtained.

The computations at step 162 may be based on physical coordinates of the viewpoint control source and the slave viewing device. The use of physical coordinates may be employed in triangulation calculations if the viewpoint control source and the slave viewing device are far enough apart to require such calculations. In such cases, the guidance cue may include the physical coordinates of a point of interest.

In some embodiments, the guidance cue may be a captured image and the slave viewing device computes a difference between the captured image in the guidance cue and a captured image obtained in the slave viewing device.

Figure 4:
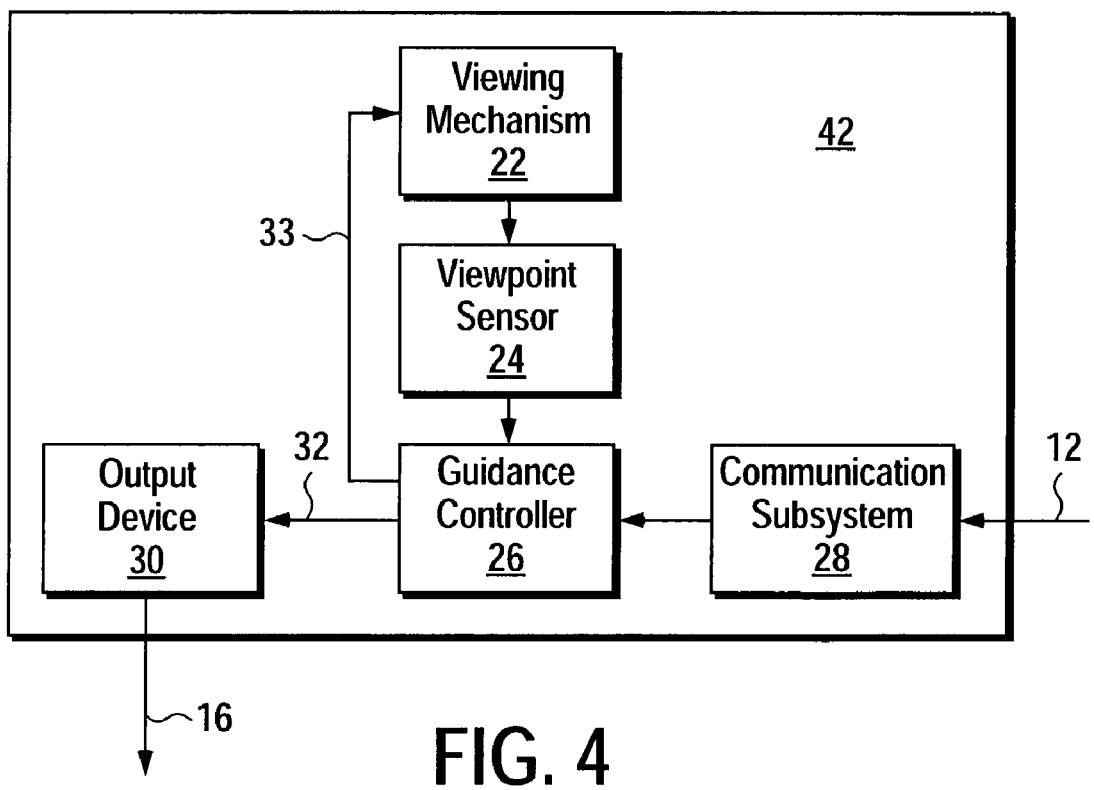
FIG. 4 shows directed guidance mechanisms of a slave viewing device in one embodiment.

FIG. 4 shows directed guidance mechanisms of the slave viewing device 42 in one embodiment. The slave viewing device 42 includes a viewing mechanism 22, a communication subsystem 28, a viewpoint sensor 24, a guidance controller 26, and an output device 30. The viewing mechanism 22 along with the communication subsystem 28, the viewpoint sensor 24, the guidance controller 26, and the output device 30 may be implemented as a handheld device or a head mounted device or may be a device mounted on a tripod or other mechanism which may be manipulated by a user.

The viewing mechanism 22 may be any type of viewing mechanism. Examples include a binocular viewing mechanism, telescope viewing mechanism, a video camera viewing mechanism, a still camera viewing mechanism, etc.

The communication subsystem 28 obtains guidance cues and in some embodiments related information via the communication path 12. The communication subsystem 28 is adapted to the implementation of the communication path 12. The communication path 12 may be wired-based communication path or a wireless communication path such as infrared or radio frequency link.

The viewpoint sensor 24 senses a current viewpoint of the slave viewing device 42 as seen through the viewing mechanism 22. The viewpoint sensor 24 may be a device for determining spatial coordinates and/or spatial orientation of the viewing mechanism 22. For example, the viewpoint sensor 24 may include a GPS receiver, a compass, integrated accelerometers, or gyroscopic reference, etc. The viewpoint sensor 24 may measure position and orientation relative to a reference device as in a polhemus system.

The guidance controller 26 obtains a guidance cue from the communication subsystem 28 and the current viewpoint from the viewpoint sensor 24 and in response calculates a difference between the current viewpoint and the viewpoint indicated by the guidance cue.

The guidance controller 26 may generate a guidance signal 32 which indicates the difference between the current viewpoint and the viewpoint indicated by the guidance cue. The output device 30 generates the guidance output 16 in response to the guidance signal 32. The guidance output 16 guides the user 14 in moving the viewing direction of the slave viewing device 42.

The guidance controller 26 may generate a guidance signal 33 which indicates the difference between the current viewpoint and the viewpoint indicated by the guidance cue. The guidance signal 33 directly manipulates a viewpoint control mechanism in the viewing mechanism 22. For example, the viewing mechanism 22 may have controllable optics such as tilt, focus, and zoom which may be used to move the viewpoint of the slave viewing device 42 in accordance with the guidance cue. In such an embodiment, the guidance signal 33 causes the tilt mechanism to tilt in a particular direction, and/or causes the focus mechanism to focus to a particular distance, and/or cause a zoom mechanisms to zoom in or out.

The guidance controller 26 may include a selection function which selects whether or not to ignore guidance cues from particular sources or that pertain to particular types of guidance cues. This selection function may be responsive to a set of stored preferences which may be programmed by the user 14.

In some embodiments, the slave viewing device 42 includes an additional output device for providing information to the user 14 which pertains to a current viewpoint of the viewing mechanism 22 or which pertains to a guidance cue received via the communication path 12. The additional output device may provide audio and/or visual information to the user 14.

The slave viewing device 42 may include a persistent memory for providing a store of user preferences related to its guidance functions as well as a user interface for selecting and altering the user preferences. Any type of user interface may be employed which is appropriate to the implementation of the slave viewing device 42.

Figure 5:
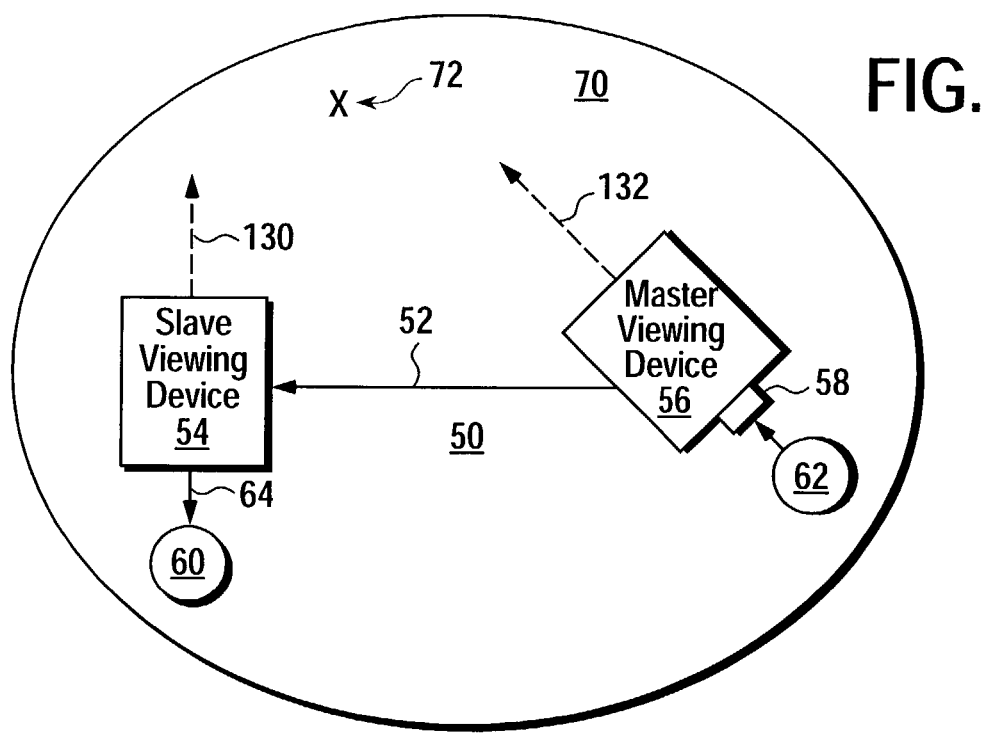
FIG. 5 illustrates a viewing system according to the present techniques in an event arena.

FIG. 5 illustrates a viewing system 50 according to the present techniques which is used for viewing in an event arena 70. The viewing system 50 in this embodiment includes a master viewing device 56 and a slave viewing device 54 which communicate via a communication path 52.

A user 62 controls a viewpoint 132 of the master viewing device 56. Similarly, a user 60 controls a viewpoint 130 of the slave viewing device 54.

The master viewing device 56 has a button 58 that when pushed by the user 62 causes the master viewing device 56 to measure its viewpoint 132, and transfer it to the slave viewing device 54 via the communication path 52 as a guidance cue. In response to the guidance cue received via the communication path 52, the slave viewing device 54 measures its viewpoint 130 and then generates a guidance output 64 to guide the user 60 in changing the viewpoint 130 or internally moves its viewing mechanism or both.

The guidance cues from the master viewing device 56 to the slave viewing device 54 enable the user 62 to guide the user 60 to a point of interest 72 in the event arena 70. For example, the user 62 may guide the user 60 to the point of interest 72 by manipulating the master viewing device 56 so that its viewpoint 132 is aimed at the point of interest 72 and then pressing the button 58. The resulting guidance output 64 causes the user 60 to move the slave viewing device 54 so that its viewpoint 130 moves toward the point of interest 72. For example, if the slave viewing device 54 includes a haptic output device then the user 60 feels the slave viewing device 54 push or pull them toward the point of interest 72. If the slave viewing device 54 has an audio output device then the user 60 may hear a command such as "move up" or "move down" or "left" or "right," etc., to direct the viewpoint 130 toward the point of interest 72. Alternatively, the viewing mechanisms in the slave viewing device 54 may be directly moved in response to a guidance cue from the master viewing device 56.

The master viewing device 56 may be implemented with slave functionality and the slave viewing device 54 may be implemented with master functionality. This enables an exchange of guidance cues between the users 60 and 62.

Figure 6:
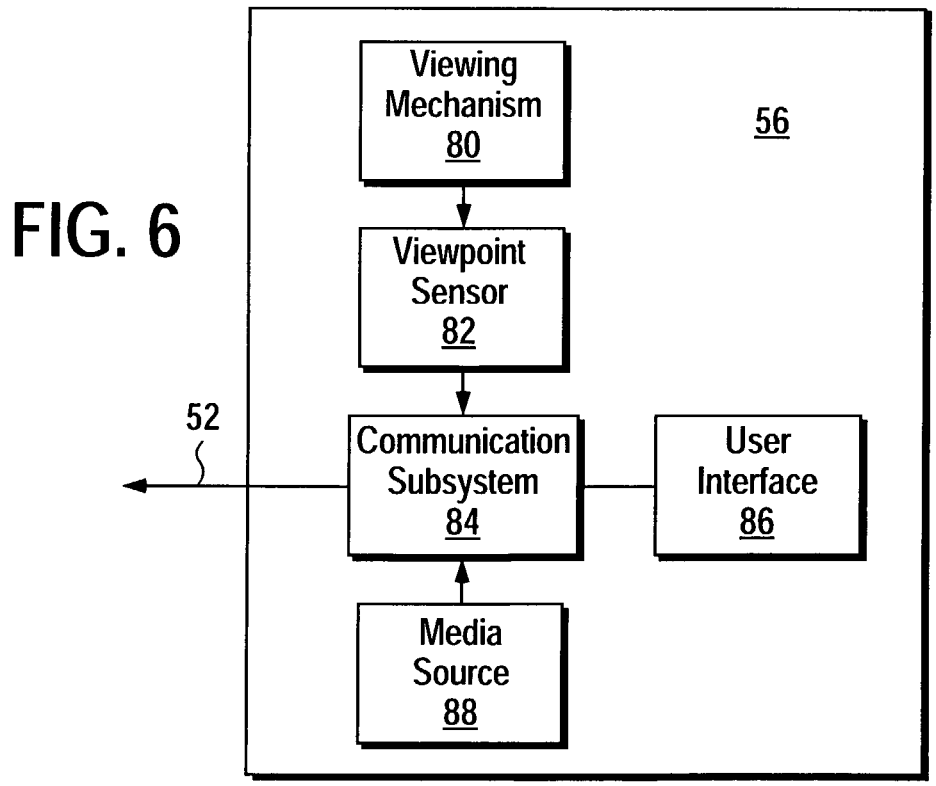
FIG. 6 shows directed guidance mechanisms of a master viewing device in one embodiment.

FIG. 6 shows directed guidance mechanisms of the master viewing device 56 in one embodiment. The master viewing device 56 includes a viewing mechanism 80 and a viewpoint sensor 82 that senses a current orientation of the viewpoint 132 of the viewing mechanism 80. The master viewing device 56 includes a communication subsystem 84 that transmits the current viewpoint via the communication path 52 as a guidance cue in response to an action by the user 62 entered via a user interface 86—for example a push of the button 58. The master viewing device 56 includes a media source 88 for providing audio and/or visual information pertaining to the guidance cue.

In some embodiments, the relative orientation of the viewing devices 54 and 56 are determined by image analysis using known computer vision techniques. An image processor, located in the viewing device 54 or the viewing device 56, or elsewhere, obtains sampled images from the viewing mechanisms in the viewing devices 54 and 56. The image processor performs an image comparison to determine the relative viewpoints 130-132 of the viewing devices 54 and 56. The image comparison may involve comparison of the raw image data in the sampled images and/or may involve the detection of known landmarks in the event arena 70. For example, the relative positions of a known landmark in a sampled image from a pair of digital cameras may be used to determine the relative viewpoints of the digital cameras.

If more than two viewing devices are included in a viewing system, a display or voice command may be used to indicate which user had pressed the "look here" button, and whether the first user wishes to accept and follow the guidance cue. This is similar to "presence" or "floor control" in a teleconferencing system. Alternatively, each viewing device may use a universal identifier to tag its guidance cue messages. An indication of preferences may be used to indicate which will be accepted.

In an application in which the master and slave viewing devices are separated by a relatively large distance, position sensors may be used to detect the relative position of the viewing devices. This information may be used by the guidance controller in a slave viewing device to triangulate in on a position. The position information may be determined for each viewing device by determining their locations relative to fixed locations. For example, location information for a viewing device may be determined by detecting that it is plugged into an outlet at a particular physical location in the event arena 70. Alternatively, position information may be determined for each viewing device using sensors such as GPS.

Figure 7:
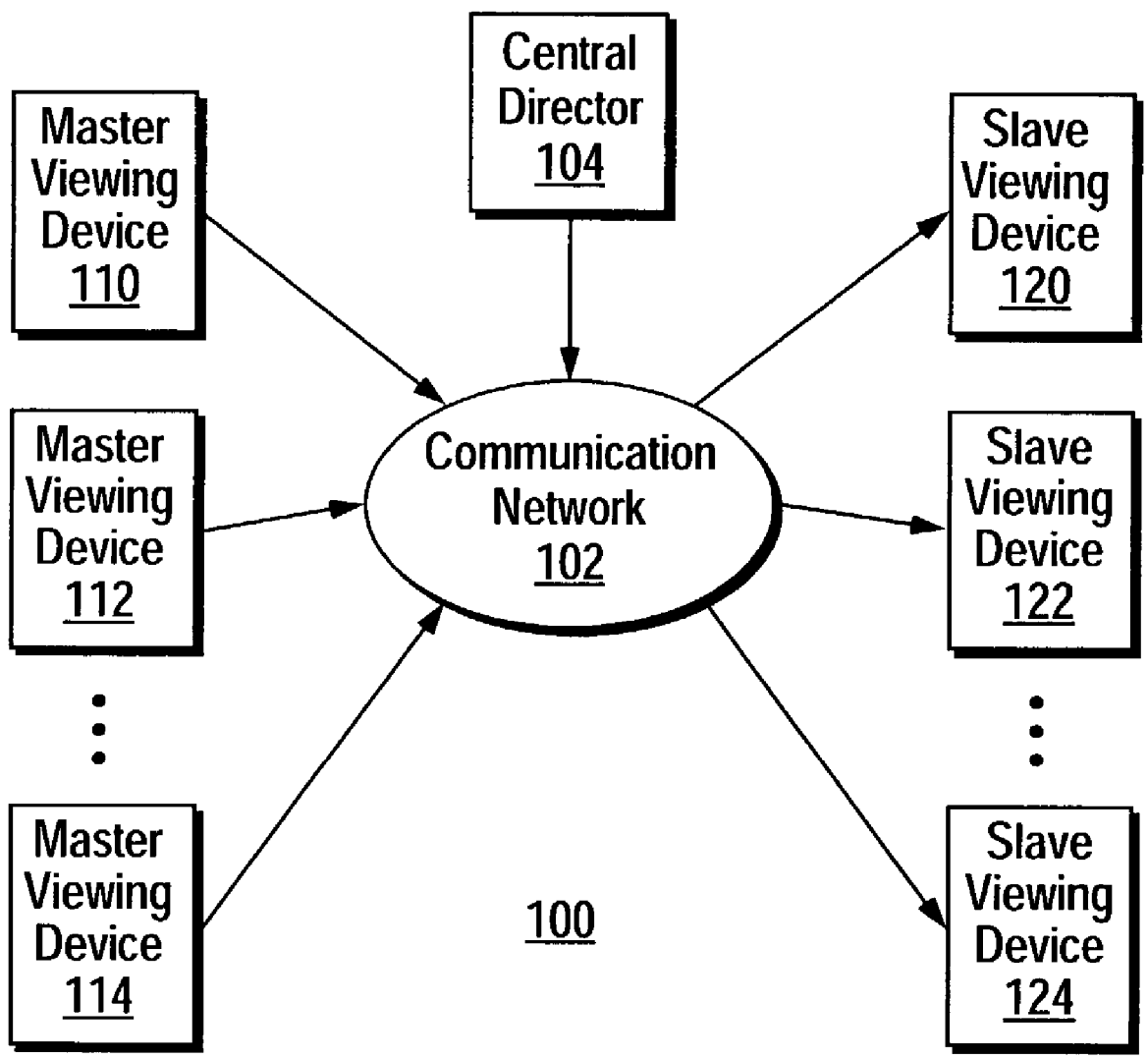
FIG. 7 illustrates a viewing system according to the present techniques in a networked environment.

FIG. 7 illustrates a viewing system 100 according to the present techniques. The viewing system 100 includes a set of master viewing devices 110-114 and a set of slave viewing devices 120-124 which communicate via a communication network 102. The master viewing devices 110-114 transmit guidance cues and related information via the communication network 102. The slave viewing devices 120-124 receive and act on guidance cues from selected ones of the master viewing devices 110-114. The master or masters for a slave may be set in the user preferences of that slave.

The viewing system 100 includes a central director 104 that distributes guidance cues for an event wide direction capability. The central director 104 may be a viewing mechanism which follows points of interest under control of one or more human operators. The guidance cues may be based on a variety of considerations. The guidance cues from the central director 104 may be used to track the motion of people of interest in an event—for example players/athletes. The guidance cues from the central director 104 may be used to track the motion of objects of interest in an event—for example, a ball or puck in a sporting event, or an airplane in an air show, or stars of stage show, etc. The guidance cues from the central director 104 may be used for places of interest—for example the finish line of a racing event. The guidance cues from the central director 104 may be specified by a human director/announcer.

Any of the slave viewing devices 120-124 may follow a subset of the guidance cues from the central director 104 according to the preferences programmed into the slave viewing devices 120-124. For example, at a car race event a user may choose through their preferences to follow a favorite driver by designating a default guidance cue source that tracks that driver. If an accident occurred, the human announcer may send an urgent guidance cue interrupt, and the slave viewing device would try to guide away from the favorite driver of the user toward the spot where the accident was occurring. Information related to the accident could simultaneously be displayed for the user. For example, the user may hear the commentator describe the accident while the viewing device is guided to the spot of the accident.

These techniques may be employed in a variety events including rock concerts, operas, game floors, audience game shows, amusement parks, sporting events, theatrical events, circuses, trade shows, conferences, as well as visits to recreational areas, wilderness preserves, and amusement parks, to name a few examples.

The foregoing detailed description of the present invention is provided for the purposes of illustration and is not intended to be exhaustive or to limit the invention to the precise embodiment disclosed. Accordingly, the scope of the present invention is defined by the appended claims.

What is claimed is:

1. A viewing system, comprising:
viewpoint control source that generates a guidance cue in response to an indication of a point of interest by a user of the viewpoint control source;
viewing device that provides a user of the viewing device with a live view such that the viewing device obtains the guidance cue from the viewpoint control source and in response guides the live view toward the point of interest.

2. The viewing system of claim 1, wherein the guidance cue provides a set of optical parameters pertaining to the viewpoint control source.

3. The viewing system of claim 1, wherein the guidance cue provides an image sampled by the viewpoint control source.

4. The viewing system of claim 1, wherein the guidance cue provides a set of information pertaining to a set of landmarks.

5. The viewing system of claim 1, wherein the viewpoint control source is a master viewing device that generates the guidance cue in response to a user input.

6. The viewing system of claim 1, wherein the viewpoint control source is a central director in an event that generates the guidance cue by determining the point of interest.

7. The viewing system of claim 1, wherein the viewing device obtains a set of information pertaining to the guidance cue from the viewpoint control source and provides the information to the user of the viewing device.

8. A viewing device that provides a user with a live view, comprising:
sensor that determines a current viewpoint of the viewing device;
communication subsystem that receives a guidance cue for a point of interest;
guidance controller that generates a guidance signal that guides the live view toward the point of interest in response to the guidance cue and the current viewpoint.

9. The viewing device of claim 8, further comprising an output device that generates a guidance stimulus in response to the guidance signal such that the guidance stimulus encourages the user to move the viewing device in accordance with the guidance cue.

10. The viewing device of claim 9, wherein the guidance stimulus provides a haptic feedback to the user.

11. The viewing device of claim 9, wherein the guidance stimulus is an audio feedback to the user.

12. The viewing device of claim 9, wherein the guidance stimulus provides a visual feedback to the user.

13. The viewing device of claim 8, further comprising a viewpoint control mechanism which is responsive to the guidance signal.

14. The viewing device of claim 8, further comprising a store of user preferences that holds an indication of whether the guidance cue is to be ignored.

15. The viewing device of claim 8, further comprising means for providing to the user a set of information pertaining to the guidance cue.

16. A method for directed guidance of a viewing device that provides a user with a live view, comprising:
    generating a guidance cue for a point of interest during an event;
    guiding the live view toward the point of interest in response to the guidance cue.

17. The method of claim 16, wherein guiding includes generating a guidance stimulus in response to the guidance cue such that the guidance stimulus encourages the user to move the viewing device in a direction indicated by the guidance cue.

18. The method of claim 17, wherein generating a guidance stimulus comprises generating a haptic feedback to the user.

19. The method of claim 17, wherein generating a guidance stimulus comprises generating an audio feedback to the user.

20. The method of claim 17, wherein generating a guidance stimulus comprises generating a visual feedback to the user.

21. The method of claim 16, wherein guiding includes moving a viewpoint control mechanism in the viewing device in the direction indicated by the guidance cue.

22. The method of claim 16, further comprising generating a set of information pertaining to the guidance cue.

23. The method of claim 22, further comprising providing the information to the user.

* * * * *